United States Patent [19]

Foster

[11] Patent Number: 5,540,322
[45] Date of Patent: Jul. 30, 1996

[54] RECIPROCATING FLOOR CONVEYOR AND FLOOR MEMBER

[76] Inventor: Raymond K. Foster, P.O. Box 1, Madras, Oreg. 97741

[21] Appl. No.: 535,575

[22] Filed: Sep. 28, 1995

Related U.S. Application Data

[60] Division of Ser. No. 390,759, Feb. 17, 1995, Pat. No. 5,482,155, which is a continuation-in-part of Ser. No. 304,404, Sep. 12, 1994, Pat. No. 5,415,271.

[51] Int. Cl.⁶ .................................................. B65G 25/04
[52] U.S. Cl. ...................... 198/750.3; 198/750.4
[58] Field of Search .......................... 198/750.2, 750.3, 198/750.4, 750.5, 750.6

[56] References Cited

U.S. PATENT DOCUMENTS

| | | | |
|---|---|---|---|
| 5,125,502 | 6/1992 | Foster | 198/750.5 X |
| 5,139,133 | 8/1992 | Foster | 198/750.4 X |
| 5,222,593 | 6/1993 | Quaeck | 198/750.5 |
| 5,238,360 | 8/1993 | Foster | 198/750.4 X |
| 5,310,044 | 5/1994 | Quaeck | 198/750.5 |
| 5,355,994 | 10/1994 | Foster | 198/750.3 X |
| 5,415,271 | 5/1995 | Foster | 198/750.3 |
| 5,419,426 | 5/1995 | Foster | 198/750.4 |

*Primary Examiner*—D. Glenn Dayoan
*Attorney, Agent, or Firm*—Delbert J. Barnard; Kathleen T. Petrich; Joan H. Pauly

[57] ABSTRACT

A floor slat member (10) having longitudinally extending first and second sidewalls (32, 34) of a reciprocating floor conveyor includes integrally formed first downwardly opening channel portion (36), having a top panel (40), laterally extending side flange (76) and the first sidewall (32), and an adjacent upwardly opening channel portion (38), having a channel wall (68) and second sidewall (34). The side flange (76) overhangs second sidewall (34) of an adjacent floor slat member (10'). An elongated seal member (72) carried by the second sidewall (34) in a channel (74) extends upwardly contacting a seal member receiving surface (78) on the first sidewall (32). An alternate embodiment has a seal receiving surface (78') on side flange (76). A central leg portion (52) extending longitudinally of floor slat member (10) and laterally between first and second sidewalls (32, 34) and connecting portion of first and second channel portions (36, 38) forms an I-beam (60) for strength and stability of the floor slat member. Abrasive debris/particulates (82) are kept clear of elongated seal member (72) via an angle of repose (84) of the debris/particulates (82) in a narrow vertical gap (80) formed by side flange (76) and second sidewall (34). A tubular extension (102) glides through a slide bearing (104), which is fixedly attached to transverse frame members (26), provides alignment and support to hydraulic motor (M) during movement back and forth of floor slat members (10, 11).

7 Claims, 10 Drawing Sheets

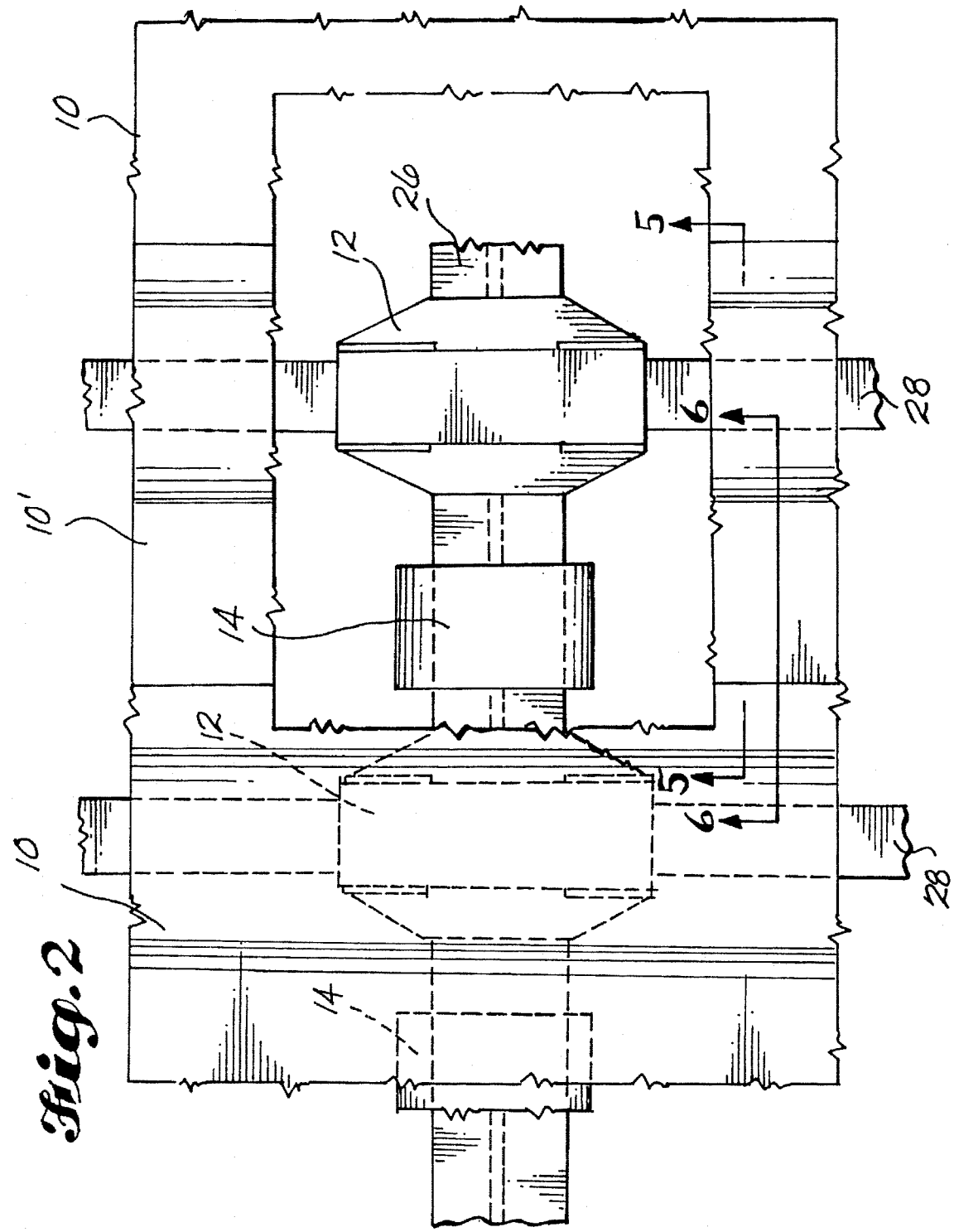

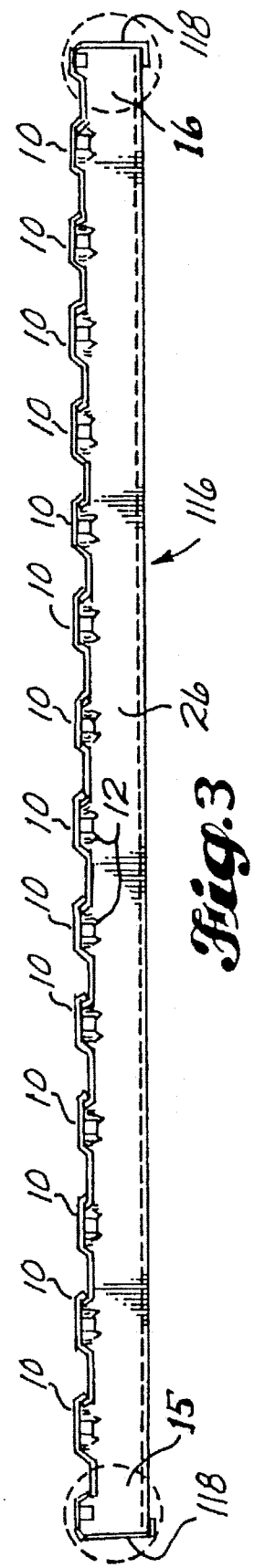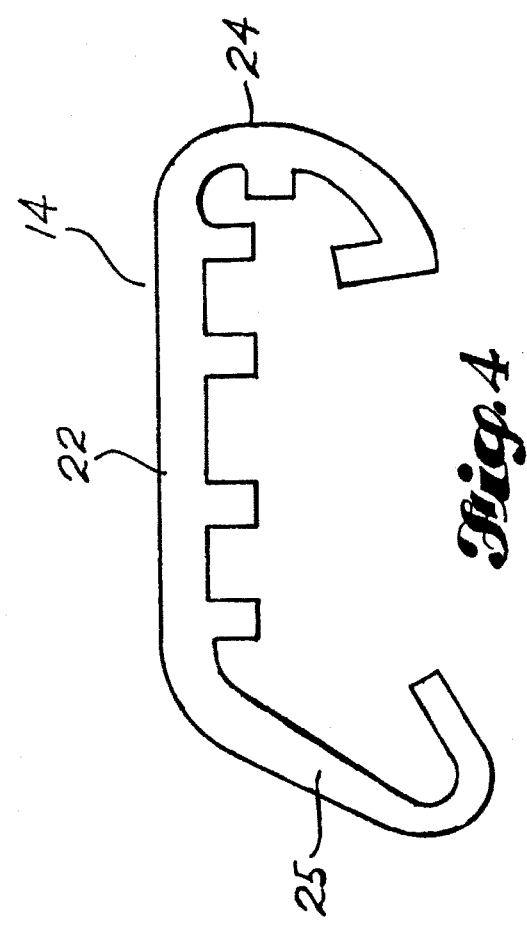

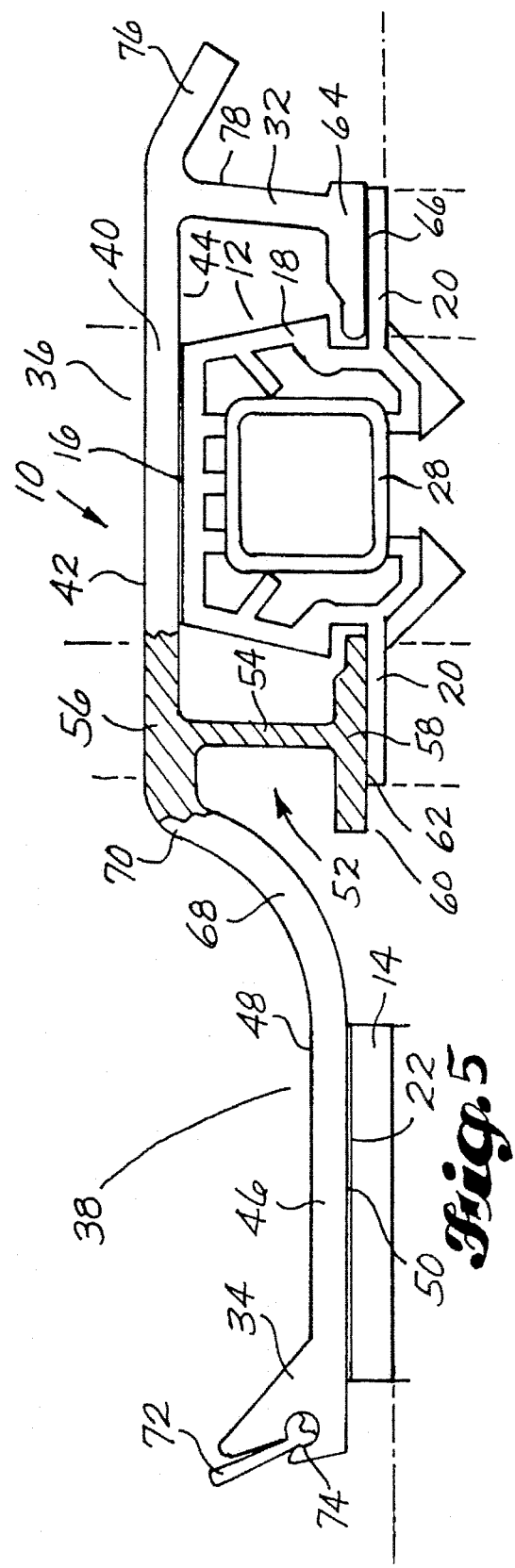
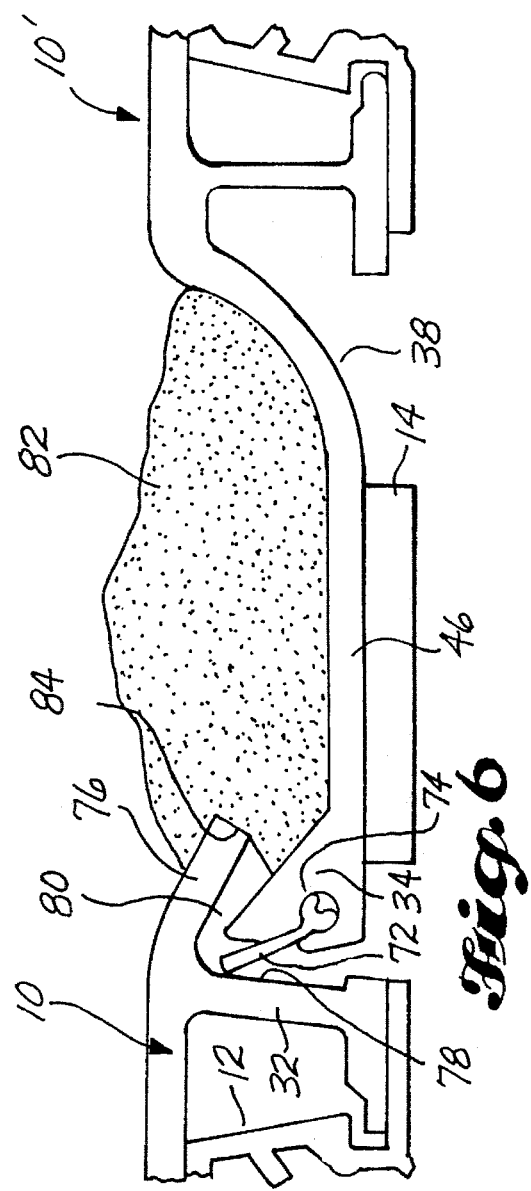

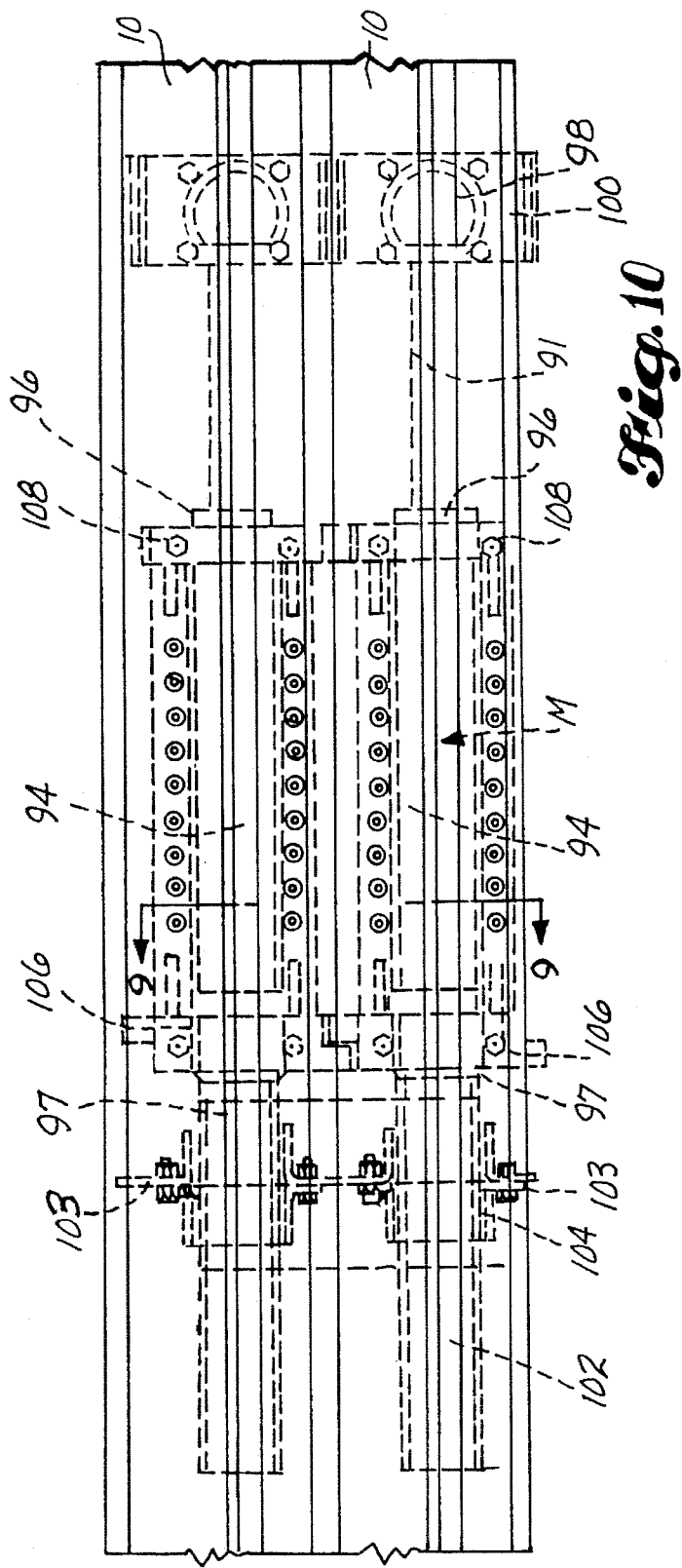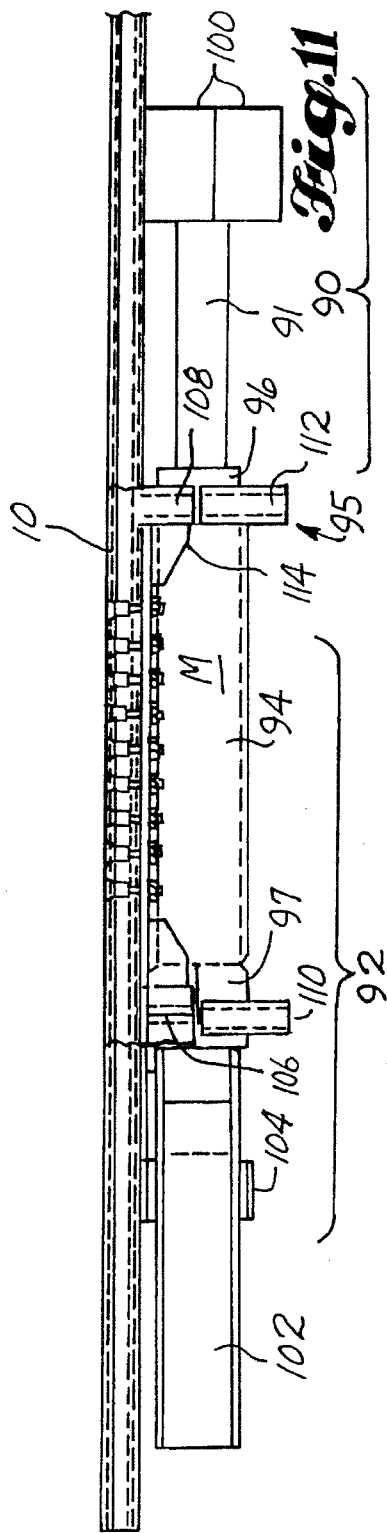

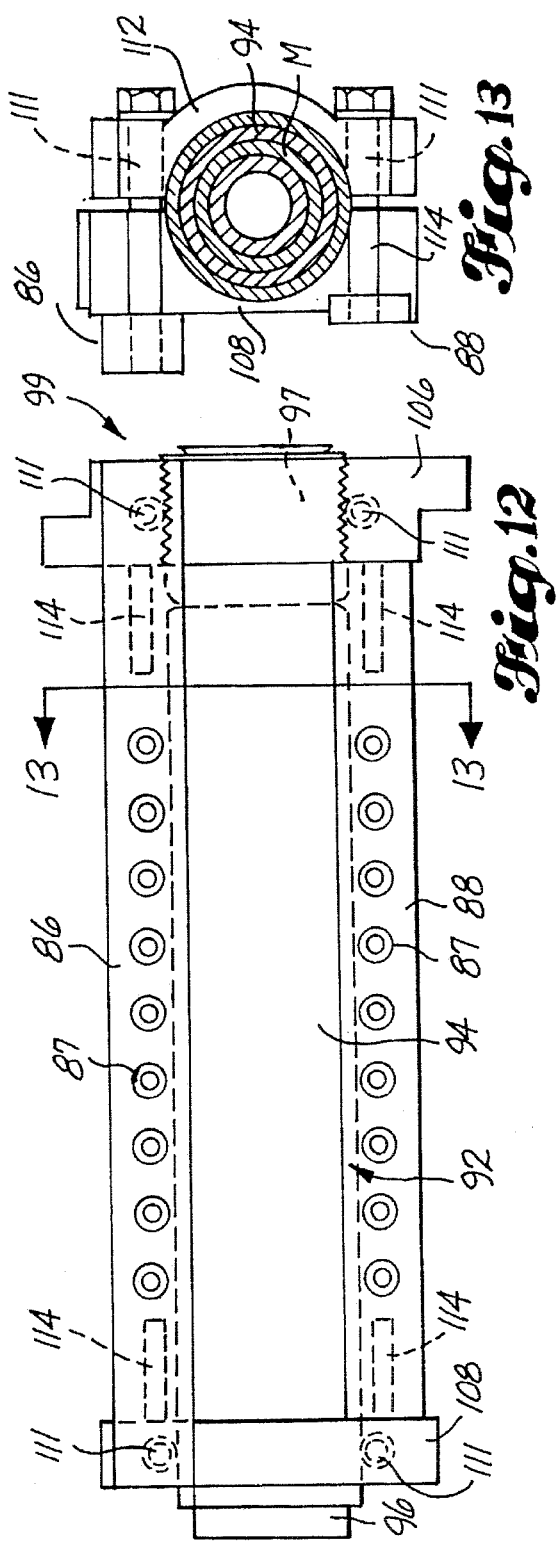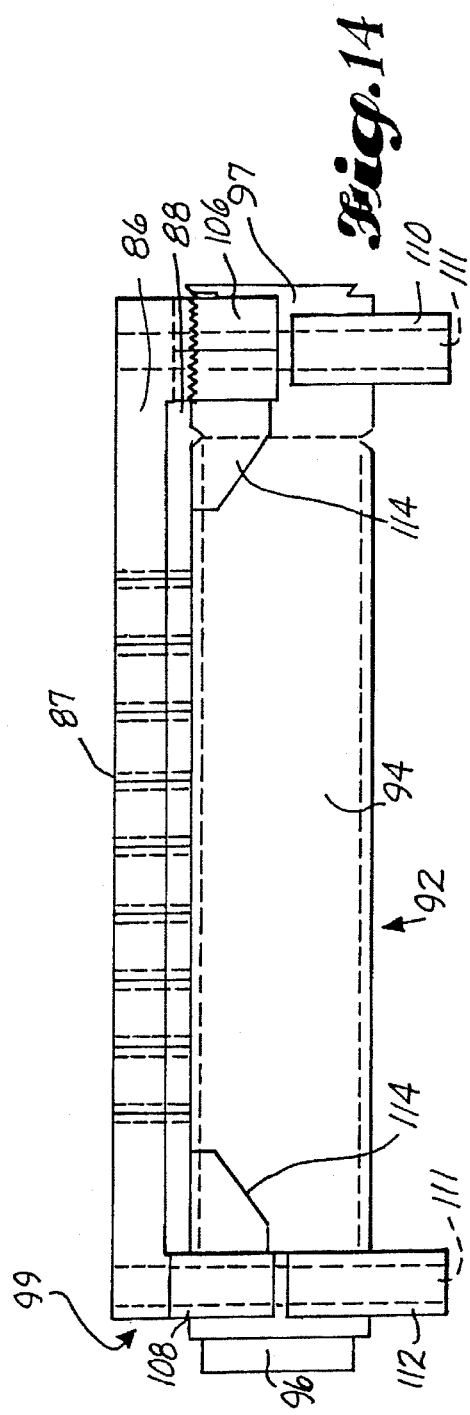

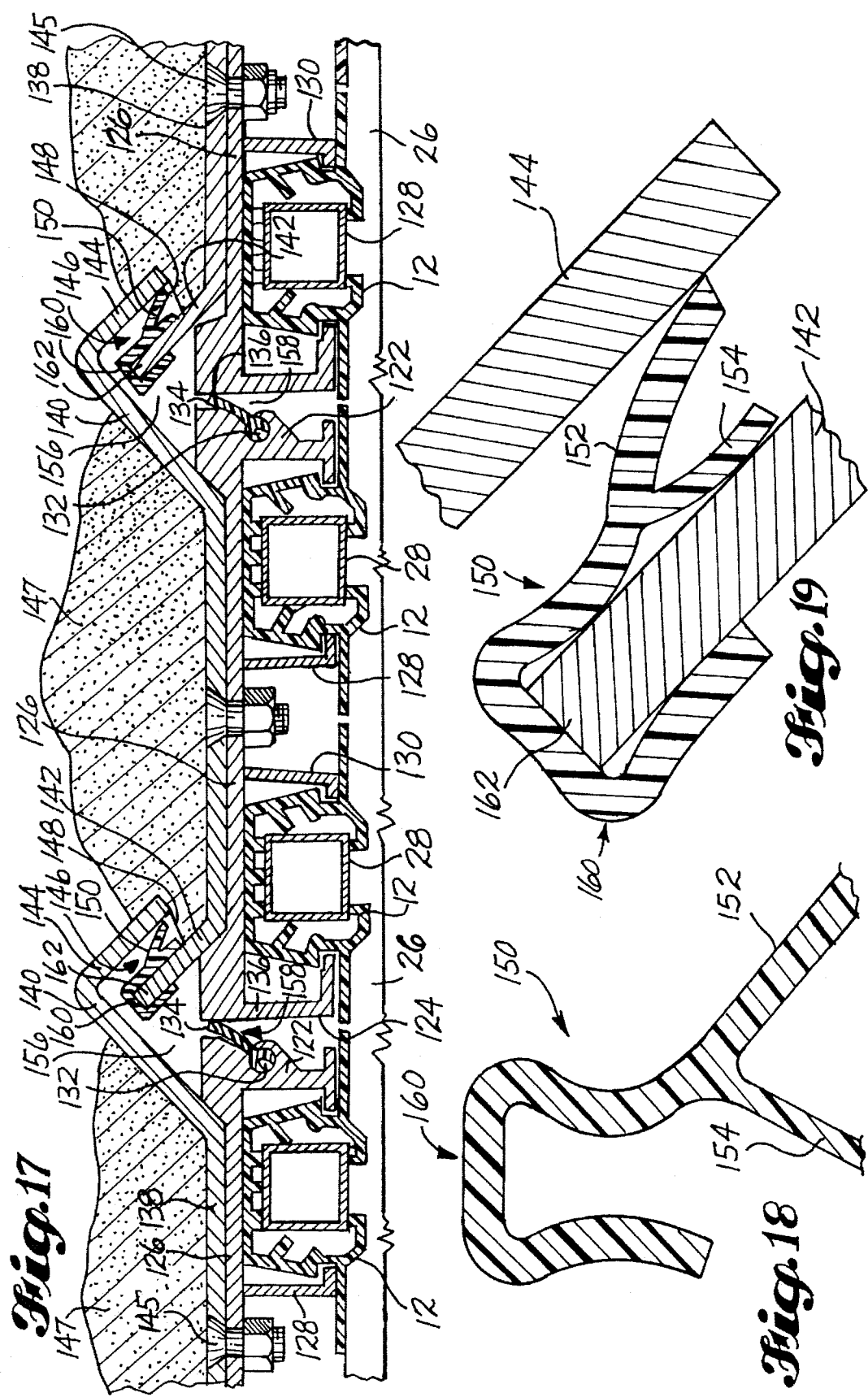

5,540,322

RECIPROCATING FLOOR CONVEYOR AND FLOOR MEMBER

RELATED APPLICATION

This is a divisional of Ser. No. 08/390,759, filed Feb. 17, 1995 now U.S. Pat. No. 5,482,155, which is a continuation-in-part of my U.S. application Ser. No. 08/304,404, filed Sep. 12, 1994, and entitled, "Reciprocating Floor Conveyor with Overlay Protection Plate," now U.S. Pat. No. 5,415,271.

TECHNICAL FIELD

This invention relates to reciprocating floor conveyors. More particularly, it relates to the provision of floor slat members for such conveyors which are adapted to collect particulate material in upwardly opening channel portions of such members and which use the angle of repose of such material to restrain movement of such material into a region where a seal member on a first floor member makes sealing contact with a seal member receiving surface on the adjacent floor member.

BACKGROUND INFORMATION

Reciprocating floor conveyors are used to facilitate removal of garbage and other bulk material from containers which are transported to a landfill or other receiving site. My U.S. Pat. No. 4,785,929, granted Nov. 22, 1988, and entitled, "Bearing System for Reciprocating Floor Conveyor," discloses a floor member and support bearing for a reciprocating floor conveyor that has been used in garbage collection containers. My U.S. Pat. No. 5,325,763 granted Jul. 5, 1994, and entitled, "Internal Check Valve," discloses a hydraulic drive assembly suitable for powering the reciprocating floor conveyor, and a desired sequence of operation.

Elongated seal strips that run the length of the floor members have been used to keep out debris and to keep material from sifting downwardly between the conveyor slats. My U.S. Pat. No. 4,896,761, granted Jan. 30, 1990, and entitled, "Reciprocating Conveyor Floor Members and Seals," discloses a side lip to protect the seal from abrasive debris which allows the floor members to be closely confronting and still retain a flexible seal to make the reciprocating floor conveyor effectively impervious. However, abrasive debris may still come into close proximity to the seals. It has been discovered that for some applications, the seals may need further protection from abrasive material.

A principal object of the present invention is to provide a unique floor slat member for a reciprocating floor conveyor, adapted so that in the conveyor each floor member overhangs a similar adjacent floor member and better protects the seals from abrasive particulate material.

DISCLOSURE OF THE INVENTION

The present invention provides an improved elongated floor slat member for a reciprocating floor conveyor. The elongated floor slat member comprises a first sidewall, an oppositely situated second sidewall and integrally formed first and second channel portions. The first channel portion opens downwardly and includes a seal receiving surface at the first sidewall. The second channel portion opens upwardly and includes a bottom surface for holding/carrying material and a seal member at the second sidewall.

In preferred form, the elongated floor slat member includes a generally vertical leg extending longitudinally from the floor slat member and laterally between the first and second sidewalls. The generally vertical leg and the first sidewall each include confronting, laterally inwardly projecting bottom flanges which are in coplanar parallelism. The bottom flanges are vertically offset below and parallel with a bottom panel of the second channel portion.

Another aspect of this invention includes providing the floor slat member with a laterally projecting side flange that extends laterally outwardly from a top panel of the first channel, outwardly beyond the first sidewall. A seal member receiving surface is below the side flange. An elongated seal member is supported on the second sidewall and extends into sealing contact with the seal member receiving surface of an adjacent floor member. The side flange of a first elongated floor slat member overhangs the second sidewall and the seal member of a second elongated floor slat member. The seal member of the second elongated floor slat member contacts the seal member receiving surface of the first elongated floor slat member.

In preferred form, the side flange slopes downwardly and outwardly from the top of the first sidewall. The top panel extends laterally from the top of the web in the opposite direction of the first channel to a connection with the second channel.

In another preferred form, the bottom of the web has a bottom flange extending perpendicular to the web. The leg portion and the top panel of the first channel portion together form an I-beam extending longitudinally of the floor slat member.

In preferred form, the seal member receiving surface is a lower surface on the first sidewall. In an alternate embodiment, the seal member receiving surface is a lower surface on the side flange. The second sidewall includes an elongated seal member retaining channel with a lower portion of the elongated seal member received within the retaining channel.

Another aspect of the invention includes providing a plurality of elongated floor slat members that are advanced in a first direction to convey a load and are retracted in the opposite direction. Each elongated floor slat member is supported on a plurality of support bearings, which are received within the downwardly opening channel space of the first channel portion. The support bearings contact a bottom surface of the top panel and a bottom surface of the bottom panel. The support bearings are supported on a plurality of guide beams.

Another aspect of the invention includes providing a floor slat construction which uses the angle of repose of the particulate material for restraining such material from upward movement into a narrow gap defined vertically between the side flange and the second sidewall of the adjacent elongated floor slat member.

Another aspect of the invention includes providing an alignment and support means for each of the hydraulic drive units which drive the elongated floor slat members.

The main advantages of this invention are: 1) the strength of the one-piece floor slat member that has an I-beam central support for carrying particulates, garbage, debris and other heavy loads; 2) the overhanging side flange in conjunction with the adjacent floor slat member's sidewall adds protection to the elongated seal member; 3) the material is restrained from entering a gap between the side flange and the adjacent floor slat member's sidewall by an angle of repose of the material; 4) there is a receptacle for storing and carrying liquids that drains from the solid material; and 5) improved alignment and support for the hydraulic drive units.

These and other advantages and features will become apparent from a review of the following detailed description of the best mode for carrying out the invention, the drawing, and the claims, all of which comprise the disclosure of the present invention and are included herein by reference.

BRIEF DESCRIPTION OF THE DRAWING

Like reference numerals are used to designate like parts through out the several views of the drawing, and:

FIG. 2 is a fragmentary top plan view of adjacent floor slat members, with portions of floor slat members cut away to disclose the two slide bearings;

FIG. 3 is a full-width end elevational view of the floor slat members attached to a floor frame;

FIG. 4 is an end elevational view of the preferred embodiment of one of the slide bearings;

FIG. 5 is an end elevational view of a floor slat member and its slide bearings and guide beam, taken substantially along line 5—5 of FIG. 2, with an I-beam portion shown in section;

FIG. 6 is a fragmentary end elevational view taken substantially along lines 6—6 of FIG. 2, such view showing parts of a floor slat member and an adjacent second floor slat member, and such view depicting particulates in an upwardly opening channel space and showing the particulates restrained by an angle of repose of the particulates from entering a gap between the floor slat members;

FIG. 10 is a fragmentary top plan view of two adjacent floor slat members depicting the drive attachment to the floor slat members shown in dashed lines;

FIG. 11 is a side elevational view of the adjacent floor slat member and drive attachments of FIG. 10;

FIG. 12 is a top plan view of a cylinder barrel of the linear hydraulic motor, showing supporting framework for a floor slat member;

FIG. 13 is a sectional view taken through the cylinder barrel substantially along lines 13—13 of FIG. 12;

FIG. 14 is a side elevational view of the cylinder barrel of FIG. 12, with the bolts' heads holding the end clamps together not shown;

FIG. 17 is a sectional view of an alternate embodiment of a floor slat member, such view showing overlaying channels including an overhanging side flange, and such view showing an angle of repose formed in the material to restrain the material, and showing the side flange positioned to protect an overlay seal member and a lower second seal member;

FIG. 18 is an enlarged section view of the overlay seal member; and

FIG. 19 is an enlarged section fragmentary view of the overlay seal member in relationship to a side flange and a second wall portion.

BEST MODE FOR CARRYING OUT THE INVENTION

The reciprocating floor conveyor of the present invention includes conveyor slats or floor members that are moved in one direction to advance a load and are retracted in the opposite direction. In preferred form, the floor members are divided into three sets. All of the floor members are moved in unison in a first direction to advance the load. The floor members are then retracted one set at a time in the opposite direction until all floor members are back at a "start" position. The operation is then repeated. The present invention may also be used in a reciprocating floor conveyor in which more than one half of the floor members are always advancing while the remaining floor members are returning at a higher rate of speed. Further, the present invention can be used for reciprocating floor conveyors having any sequence of operation. The reciprocating floor conveyor utilizes a drive mechanism for reciprocating the floor members that may be like either the drive mechanism set forth in my aforementioned U.S. Pat. No. 5,325,763 or in my U.S. Pat. No. 4,748,893, granted Jan. 7, 1988, and entitled, "Drive/Frame Assembly for a Reciprocating Floor," for example.

The conveyor frame is composed of longitudinally spaced apart transverse frame members, sometimes referred to as "sills," which serve to support and guide the floor members and longitudinal frame members to which the transverse frame members are connected. Examples of the conveyor frame are set forth in my U.S. Pat. No. 4,474,285, granted Oct. 2, 1984, entitled, "Drive Unit Mount for Reciprocating Floor Conveyor," and in my U.S. Pat. No. 5,350,054, granted Sep. 27, 1994, and entitled, "Ball Block for Mounting Linear Motor."

In prior art conveyors, the floor slat members are supported by and move on a plurality of bearings, which, in turn, are mounted on a plurality of longitudinal guide beams. Conveyors constructed according to the present invention utilize guide beams and a bearing which is part of the prior art, but in combination with a new floor slat configuration, and a new bearing as discussed in more detail later.

Figure 1:
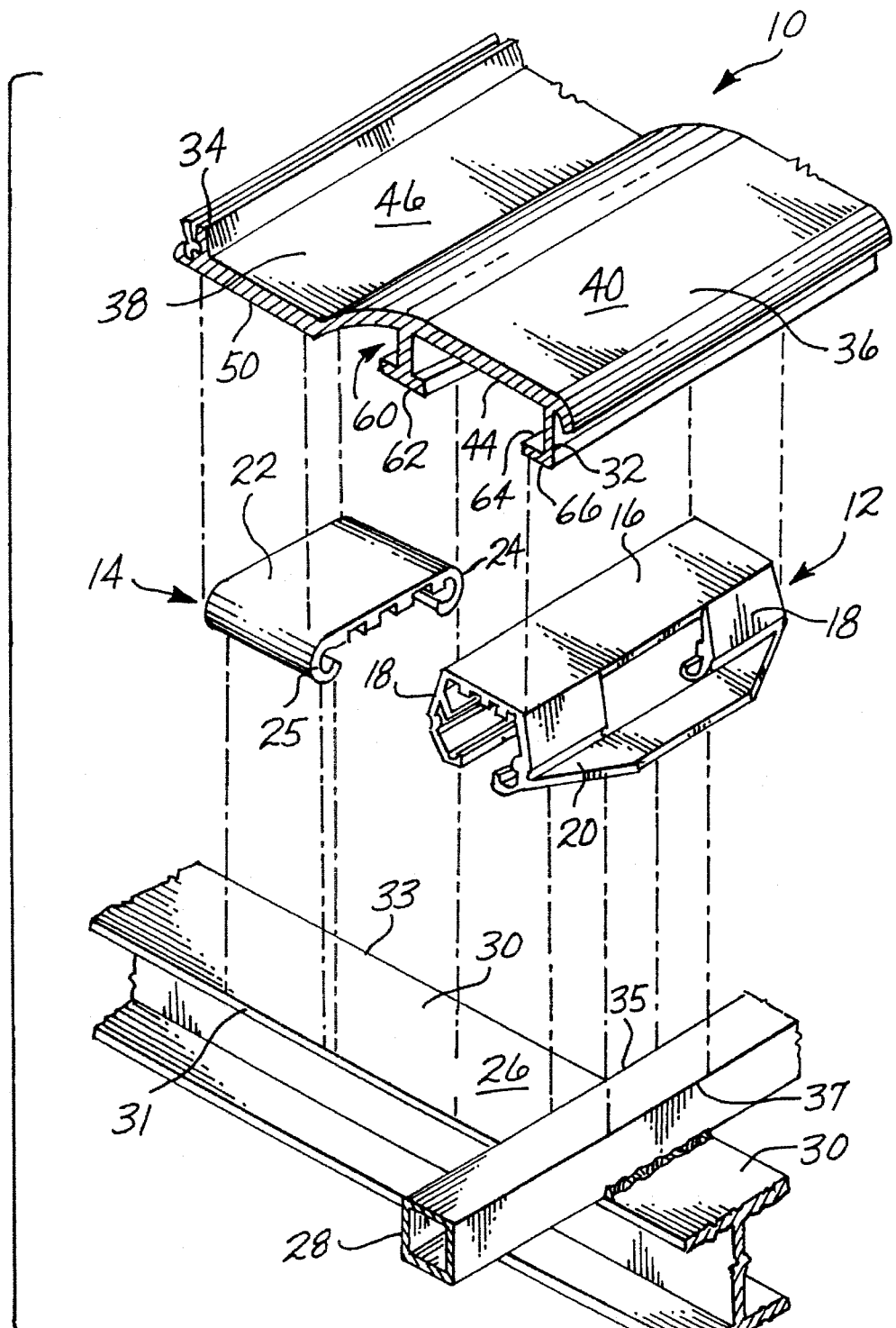
FIG. 1 is an exploded fragmentary pictorial view of two slide bearings spaced above a guide beam and a floor slat member spaced above the bearings.

Referring to FIGS. 1–3, the conveyor floor comprises a plurality of side-by-side floor slat members 10, each of which rides on a pair of bearings 12, 14. In preferred form, the bearings 12, 14 are snap fitted onto portions of the framework. Large bearing 12 is preferably like the bearings disclosed in FIGS. 11–15 of my aforementioned U.S. Pat. No. 4,785,929. It includes a top portion 16, a pair of sidewalls 18, and a pair of wings 20 that extend perpendicularly from sidewalls 18. Small bearing 14 is a new design and has a top portion 22 and a pair of inwardly curving hook portions 24, 25. FIG. 4 depicts an alternate and preferred embodiment of small bearing 14.

The framework members important to this invention are a plurality of transverse frame members 26 and a plurality of longitudinal guide beams 28. Transverse frame members 26 are spaced apart longitudinally of the conveyor in the manner disclosed by my aforementioned U.S. Pat. No. 4,474,285, for example. In preferred form, longitudinal guide beams 28 are square tubular members and may measure one inch by one inch in cross-section, although other shapes or sizes may be used. The guide beams 28 mount perpendicularly to transverse frame members 26 and are welded to an upper flange 30, as is shown in FIG. 1. Transverse frame member 26 is shown as an I-beam member, but may be other shapes, such as tubular, channel-shaped, or Z-shaped. Small bearing 14 snaps on to upper flange 30 at 31, 33. Large bearing 12 snaps on guide beam 28 at 35, 37.

Referring to FIG. 5, each floor slat member 10 includes a first sidewall 32 and an oppositely situated and laterally spaced second sidewall 34. Between first and second sidewalls 32, 34 are integrally-formed first and second channel portions 36, 38. First channel portion 36 is downwardly opening and includes a top panel 40 having a top surface 42 and a bottom surface 44. Second channel portion 38 is upwardly opening and has a bottom panel 46 formed integrally with second sidewall 34. Bottom panel 46 includes a top surface 48 and a bottom surface 50. A generally vertical leg 52 extends longitudinally of first and second channel portions 36, 38 and laterally between the first and second sidewalls 32, 34. Leg 52 includes a generally vertical web 54, a top portion 56, which is an extension of top panel 40 and is generally perpendicular to web 54, and bottom flange 58, which is also generally perpendicular to web 54 and at the opposite end of top portion 56. The top portion 56, the web 54, and bottom flange 58 form essentially an I-beam 60, which adds structural support and strength to the floor slat members. Bottom flange 58, having a bottom surface 62, extends laterally in both directions from web 54.

First sidewall 32 includes a bottom flange 64 having a bottom surface 66. Flange 64 extends laterally and generally perpendicularly from first sidewall 32. Bottom surface 66 of first sidewall 32 is coplanar and parallel to bottom surface 62 of flange 58. A generally central, curved channel wall 68 is positioned between bottom panel 46 and top portion 56 of web 54. Second channel portion 38 comprises channel wall 68, bottom panel 46 and second sidewall 34. Channel wall 68 joins top panel 40 at top portion 56 of I-beam 60 at a transition region 70. Channel wall 68 curves outwardly then downwardly from the top panel into the channel wall 68.

Second sidewall 34 holds a flexible, elongated seal member 72. Elongated seal member 72 is positioned inside a narrow channel 74 inside second sidewall 34. The elongated seal member is made of an elastomeric material and may include two legs at one end for better fit in the narrow channel, like the seal member described in my U.S. Pat. No. 4,896,761, granted Jan. 30, 1990, and entitled, "Reciprocating Conveyor Floor Members and Seals."

Figure 7:
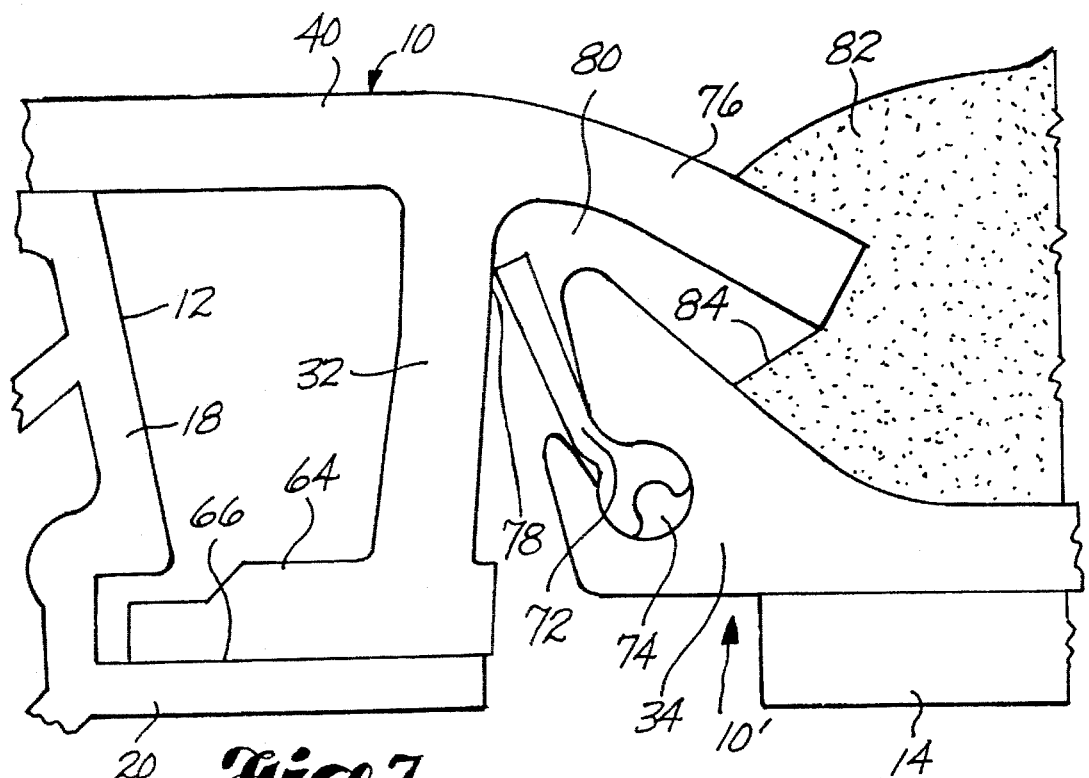
FIG. 7 is an enlarged scale fragmentary end elevational sectional view depicting a seal member of a second floor slat member contacting a seal member receiving surface of an adjacent first floor slat member and depicting a gap that is generally vertically between an overhanging side flange on the first floor slat member and a sidewall of the adjacent second floor slat member, such view showing the granular material assuming an angle of repose at the outer edge of the overhanging side flange.
Figure 8:
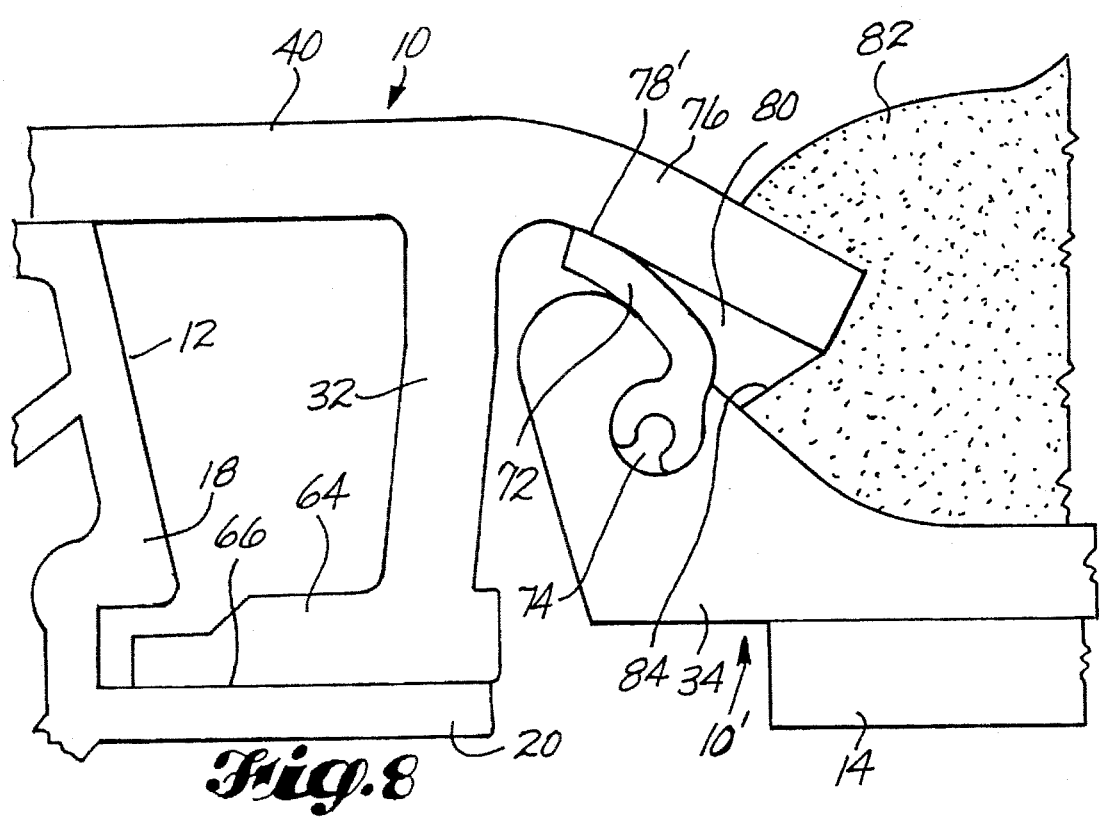
FIG. 8 is a view like FIG. 7 but of an alternate seal member design including a seal receiving surface on the bottom of the side flange and a seal member angled upward and outward to contact the new seal member receiving surface.

The top panel 40 extends laterally past first sidewall 32 to form a side flange 76. Side flange 76 extends downwardly and outwardly to extend over both second sidewall 34 and elongated seal member 72 of adjacent floor member 10', better depicted in FIGS. 6–8. Elongated seal member 72 contacts a seal member receiving surface 78. Referring to FIG. 7, seal member receiving surface 78 is a surface below side flange 76, and on the first sidewall 32. An alternate embodiment of seal member receiving surface 78 is shown in FIG. 8, where seal member 72 contacts a seal receiving surface 78' of side flange 76.

Referring to FIGS. 1 and 5 again, in assembled condition, floor slat member 10 rests on bearings 12, 14. Specifically, bottom surface 44 of top panel 40 rests on top portion 16 of bearing 12. Bottom surface 50 of bottom panel 46 rests on top portion 22 of small bearing 14. Bottom surfaces 62, 66 of I-beam 60 and first sidewall bottom flange 64, respectively, rest directly on or are slightly above wings 20 of large bearing 12. Wings 20 provide mutual bracing. When installed, bottom surface 50 of bottom panel 46 is in offset parallelism with bottom surfaces 62 and 66, as shown in FIG. 5.

Referring again to FIG. 6, side flange 76 overhangs second sidewall 34 and elongated seal member 72 to form a narrow generally vertical gap 80. Gap 80 is defined by and vertically between side flange 76 and second sidewall 34. The side flange 76 protects the elongated seal member from solid particulates and liquids by blocking the particulates from direct access to the elongated seal member 72. Referring also to FIGS. 7–8, particulates 82 on top of floor slat members 10 form an angle of repose at 84. Because of the position of the side flange 76 over the second sidewall 34, particulates 82 generally do not come into contact with the elongated seal member 72, thereby adding extra sealing security and lengthened life for the seal.

Figure 9:
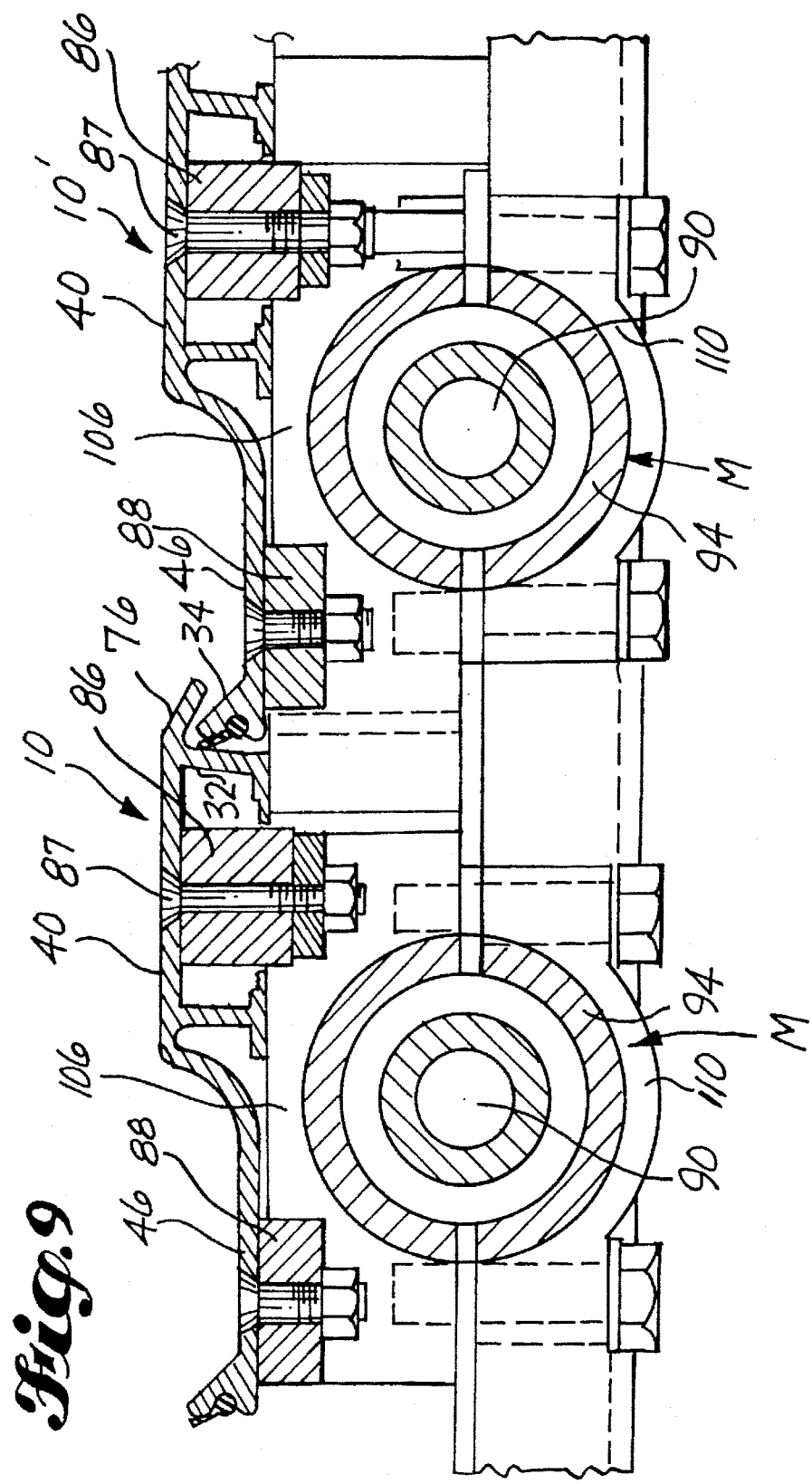
FIG. 9 is an enlarged scale fragmentary sectional view taken substantially along lines 9—9 of FIG. 10, depicting each floor slat member attached to a separate linear hydraulic motor.

Referring to FIG. 9, each floor slat member 10 is connected to a linear hydraulic motor M via an large elongated shoe pad 86 and a small elongated shoe pad 88. Top panel 40 mounts to the large shoe pad 86. Bottom panel 46 mounts to the small shoe pad 88. In preferred form, the top and bottom panels are bolted with countersunk bolts 87 to the large and small shoe pads 86, 88, respectively.

Referring also to FIGS. 10 and 11, motor M is an extensible-length piston-cylinder unit having a piston component 90, which includes a piston rod 91, that is fixedly connected to the framework (not shown) and a movable portion 92 that moves with the floor slat members 10. Movable portion 92 includes a cylinder barrel 94 and a cylinder head 96, through which the piston rod 91 extends. The outer end of piston 90 includes a ball end 98 and is supported by a ball socket (not shown) within a two-part housing 100. The two-part housing 100 forms the socket and the socket securely holds ball end 98 in place and prevents relative longitudinal movement.

At the other end of cylinder barrel 94 is a cylinder plug 97 and a tubular extension 102. Tubular extension 102 extends through a slide bearing 104 and at one end is connected to cylinder plug 97. Slide bearing 104 is secured to a portion of the framework (not shown) via a plurality of bolted clamps 103 (shown in dashed lines in FIG. 10), although other attachment means may be used. Slide bearing 104 guides tubular extension 102 so as to restrict cylinder barrel 94 to linear, reciprocating movement. Tubular extension 102 in conjunction with slide bearing 104 also provides structural support to motor M.

Referring to FIGS. 12–14, each cylinder barrel 94 is mounted to a frame 99 comprising a first upper end clamp 106 and a second upper end clamp 108, a first lower end clamp 110, and a second lower end clamp 112, each of which is constructed to cradle cylinder barrel 94. Bolts 111 fasten first upper clamp 106 to first lower clamp 110 and second upper clamp 108 to second lower clamp 112. Elongated shoe pads 86, 88 are part of frame 99 and span between and connect first upper clamp 106 and second upper clamp 108. Countersunk bolts 87 (shown less countersunk bolt heads) secure floor members 10, 10' to the shoe pads 86, 88. Shoe pads 86, 88 are, in turn, connected at their ends to the upper end clamps 106, 108. A plurality of angle brackets 114 provide additional structural support to frame 99. The basics of cylinder drives are described in greater detail in my prior U.S. Pat. No. 5,193,661, granted Mar. 16, 1993, and entitled, "System of Linear Hydraulic Motors."

Figure 16:
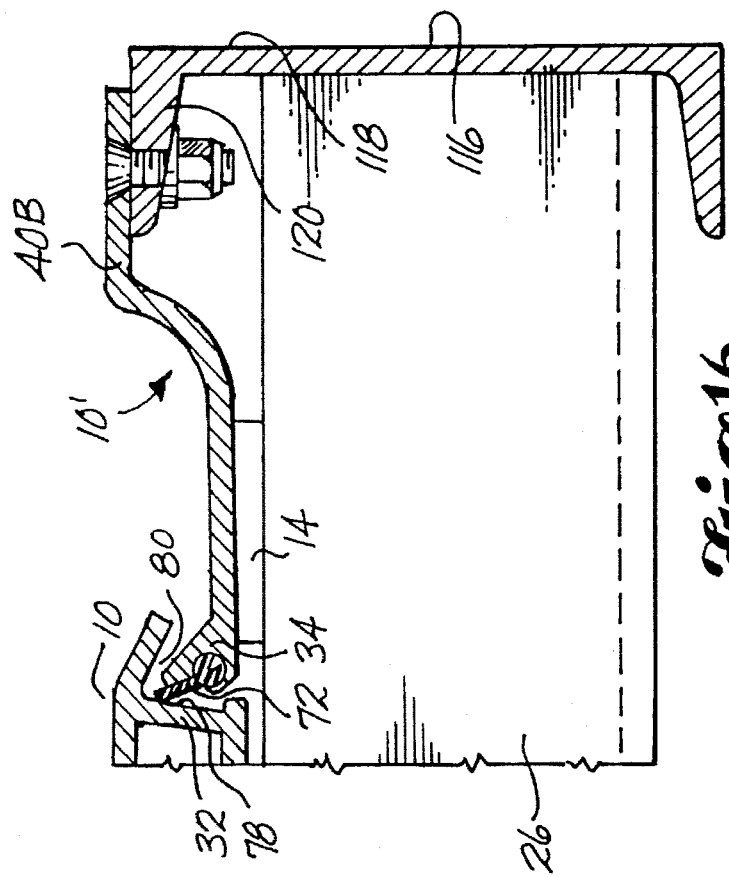
FIG. 16 is a fragmentary sectional view taken substantially at circle 16 in FIG. 3, such view showing a fixed floor slat member attached to the other side of the conveyor floor frame.
Figure 15:
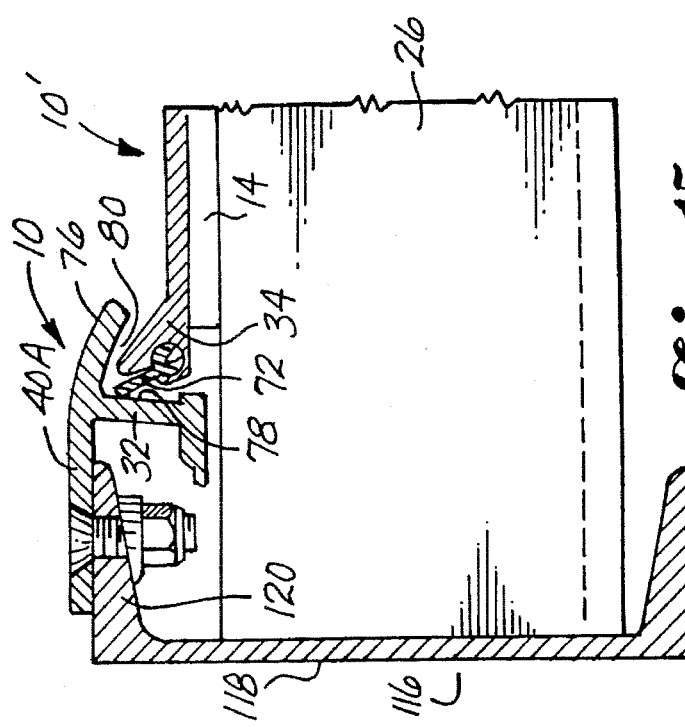
FIG. 15 is a fragmentary sectional view taken substantially at circle 15 in FIG. 3, such view showing a fixed floor slat member attached to one side of the conveyor floor frame.

In a typical installation, approximately fourteen side-by-side floor slat members 10, 10' are placed in and form the floor of a material container 116, as shown in FIG. 3. Container 116 may be part of a stationary installation or may be a rail car, a truck box, a trailer box, or a cargo container. Referring to FIGS. 15–16, floor slat members attach to a sidewall 118 of container 116 via a flange 120. The top panel 40 of a floor slat member is cut to form a partial top panel 40A. Partial top panel 40A mounts on flange 120 and is bolted together at the left side of container 116. Partial top panel 40A is cut to remove the I-beam region 60, as depicted in FIG. 15. Referring to the right side of container 116, as shown in FIG. 16, another partial top panel 40B is nearly the mate to partial top panel 40A. Flange 120 is attached to sidewall 118, preferably by a weld.

Referring to FIG. 17, floor slat member 11 is an alternative embodiment. This embodiment was originally disclosed in my aforementioned co-pending application, Ser. No. 08/304,404. Floor slat member 11 has laterally spaced-apart first and second sidewalls 122, 124 with a top panel 126 connecting the two sidewalls. Extending longitudinally of the top panel 126 are two leg portions 128, 130 that are laterally spaced apart and in between the first and second sidewall 122, 124. Floor slat member 11 snaps over two slide bearings 12, which is the same bearing used in the first embodiment for floor slat member 10. First sidewall 122 includes a narrow channel 132 to hold a lower second elastomeric elongated seal strip member 134. Second elongated seat strip member 134 contacts a seal member receiving surface 136 on second sidewall 124 of an adjacent floor member 11'.

Resting on top portion 126 is an upwardly-opening overlay channel 138 having a bottom panel 139. An upwardly extending first wall 140 extends from one end of bottom panel 139, and an upwardly and outwardly extending second wall 142 extends from the other end of the bottom panel 139. Extending outwardly and downwardly from first wall 140 is a side flange 144 that overhangs second wall 142 of an adjacent overlay channel 138' of an adjacent floor member 11'. Overlay channel 138 is attached to top portion 126 of floor slat member 11 via a bolt 145, although other attachment methods may be used.

Side flange 144 overhangs second wall 142 to form a narrow gap 146. Abrasive debris/particulates 147 resting on overlay channel 138 forms an angle of repose 148 between side flange 144 and second wall 142. An elastomeric overlay seal 150 (better depicted in FIGS. 18 and 19), having two legs 152, 154 span gap 146 and confront side flange 144 and second wall 142 in a wishbone-like design, restraining debris/particulates 147 from entering an open area 156 underneath second wall 142, side flange 144 and first wall 140. Area 156 is directly overhead a gap 158 between adjacent floor members 11, 11'. Second elongated seal strip member 134 spans gap 158 to confront second sidewall 124.

Overlay seal 150, therefore, protects second seal member 134 and gap 158 from abrasive debris, and also the hydraulic drive unit members below floor member 11, not shown. Overlay seal 150 also has a curved tail end 160 which covers an end 162 of second wall 142 to further protect floor slat member 11 from debris/particulates 147 and friction during back and forth movement.

Another feature of the integral one-piece floor member as depicted in FIGS. 1–3 and 5–8 is that debris and liquids collect in the bottom panel 46, as inferred from FIG. 6. As floor slat members 10 move, liquid is channeled and removed out the end of the container.

All of my prior patents mentioned in this application, and my co-pending application, Ser. No. 08/304,404, are hereby incorporated into this application by this reference.

It is to be understood that many variations in size, shape, and construction can be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claim or claims interpreted according to accepted doctrines of claim interpretation, including the doctrine of equivalents and reversal of parts.

What is claimed is:

1. A reciprocating floor conveyor, comprising:

a first elongated floor slat member;

a second elongated floor slat member adjacent the first floor slat member;

said second elongated floor slat member including an upwardly-opening channel portion having a bottom panel, a first wall portion extending upwardly from a first side of the bottom panel, and a second wall portion extending upwardly and outwardly from a second side of the bottom panel;

said first elongated floor slat member having a side flange portion overhanging the second wall portion of the upwardly-opening channel portion of the second elongated floor slat member, said side flange extending downwardly and outwardly in a spaced relationship from the second wall portion of the second elongated floor slat member;

wherein the second wall portion of the second elongated floor slat member and the side flange of the first elongated floor slat member form a gap between them leading upwardly and outwardly from the channel portion of the second elongated floor slat member; and wherein the side flange of the first elongated floor slat member and the second wall portion of the second elongated floor slat member are so situated that the angle of repose of particulate material collected in said upwardly-opening channel portion will restrain such material from upward movement into said gap.

2. A reciprocating floor conveyor, according to claim 1, wherein there is a seal member in said gap connected to one of said second wall portion and said side flange and making sealing contact with the other.

3. A reciprocating floor conveyor according to claim 2, wherein a seal member receiving surface is situated below said side flange.

4. A reciprocating floor conveyor according to claim 3, wherein said seal member makes contact with said seal member receiving surface.

5. A reciprocating floor conveyor according to claim 1, wherein said first wall portion of said second elongated floor slat includes a side flange extending downwardly and outwardly from said first wall portion.

6. A reciprocating floor conveyor according to claim 1, wherein said second elongated floor slat member includes a base portion having an upper portion and opposite side portions extending downwardly from said upper portion, and said bottom panel rests on and is attached to said upper portion.

7. A reciprocating floor conveyor according to claim 6, wherein each said side portion is configured to engage a bearing.

* * * * *

UNITED STATES PATENT AND TRADEMARK OFFICE
CERTIFICATE OF CORRECTION

PATENT NO: 5,540,322

DATED: July 30, 1996

INVENTOR(S): Raymond K. Foster

It is certified that error appears in the above-identified patent and that said Letters Patent are hereby corrected as shown below:

Claim 1, column 8, line 41, delete "portion".

Claim 5, line 3, after "slat", insert -- member --.

Signed and Sealed this

First Day of July, 1997

Attest:

BRUCE LEHMAN

Attesting Officer            Commissioner of Patents and Trademarks